United States Patent
Katayama et al.

(10) Patent No.: US 7,934,480 B2
(45) Date of Patent: May 3, 2011

(54) SEALING MEMBER AND SEALING STRUCTURE

(75) Inventors: Norihiro Katayama, Kariya (JP); Hirotsugu Kojima, Kariya (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 99 days.

(21) Appl. No.: 12/246,764

(22) Filed: Oct. 7, 2008

(65) Prior Publication Data

US 2009/0102137 A1 Apr. 23, 2009

(30) Foreign Application Priority Data

Oct. 19, 2007 (JP) ................................. 2007-272454

(51) Int. Cl.
*F02F 11/00* (2006.01)
*F01M 9/10* (2006.01)

(52) U.S. Cl. ...................... 123/90.37; 277/596; 277/598

(58) Field of Classification Search .................. 277/313, 277/591, 616, 594, 596, 600, 598, 612, 626, 277/644, 648, 649; 123/90.37, 195.3, 90.38
See application file for complete search history.

(56) References Cited

U.S. PATENT DOCUMENTS

| | | | | |
|---|---|---|---|---|
| 3,477,867 | A * | 11/1969 | Hillier | 427/272 |
| 5,003,958 | A * | 4/1991 | Yoneyama et al. | 123/635 |
| 5,121,933 | A * | 6/1992 | Silvers | 277/592 |
| 5,236,394 | A * | 8/1993 | Collins et al. | 464/175 |
| 5,540,468 | A * | 7/1996 | Fassman | 294/1.1 |
| 6,085,709 | A * | 7/2000 | Freese, V | 123/90.38 |
| 6,189,895 | B1 | 2/2001 | Yamada | |
| 6,269,787 | B1 * | 8/2001 | McArthy | 123/188.6 |
| 7,343,889 | B2 * | 3/2008 | Tooyama et al. | 123/90.38 |
| 7,640,905 | B2 * | 1/2010 | Nonogaki | 123/90.37 |
| 2005/0269788 | A1 | 12/2005 | Grunfeld | |
| 2006/0055123 | A1 | 3/2006 | Angot et al. | |
| 2008/0136123 | A1 | 6/2008 | Angot et al. | |
| 2008/0246232 | A1 * | 10/2008 | Takahashi et al. | 277/651 |
| 2009/0107731 | A1 * | 4/2009 | Fedorovich | 175/372 |
| 2009/0115138 | A1 | 5/2009 | Matsumoto et al. | |

FOREIGN PATENT DOCUMENTS

| | | |
|---|---|---|
| EP | 0490635 | 6/1992 |
| EP | 1900981 | 3/2008 |
| JP | 2002-195096 A | 7/2002 |
| WO | 2004/072515 | 8/2004 |
| WO | 2007/007612 | 1/2007 |

OTHER PUBLICATIONS

English language Abstract and translation JP 2002-195096 A.

* cited by examiner

*Primary Examiner* — Shane Bomar
*Assistant Examiner* — Kipp C Wallace
(74) *Attorney, Agent, or Firm* — Greenblum & Bernstein, P.L.C.

(57) ABSTRACT

A sealing member 14 has a main seal 15 and a sub seal 21. The sub seal 21 is integrally formed with a first connecting element 20 that extends from the main seal 15. The first connecting element 20 has an upper bent portion 23a and a lower bent portion 23b. The sub seal 21 is at a higher position than the main seal 15 due to the upper and lower bent portions 23a, 23b. The first connecting element 20 has a rib 24 that extends along a longitudinal direction of the first connecting element 20. An upper thick portion 26a and a lower thick portion 26b are formed on the upper bent portion 23a and the lower bent portion 23b of the first connecting element 20, respectively. The rib 24 and the upper and lower thick portions 26a, 26b improve the rigidity of the first connecting element 20.

14 Claims, 6 Drawing Sheets

SEALING MEMBER AND SEALING STRUCTURE

BACKGROUND OF THE INVENTION

The present invention relates to a sealing member and a sealing structure, and more particularly relates to a sealing member that is provided between a cylinder head and a cylinder head cover of an engine for a vehicle and a sealing structure having the sealing member.

Conventionally, for example, Japanese Laid-Open Patent Publication No. 2002-195096 discloses a sealing structure having this kind of sealing member. In the configuration, a groove is formed at a periphery of an opening of a cylinder head and a loop-like sealing member is fitted to the groove. With a cylinder head cover provided on the cylinder head, the sealing member is located between the cylinder head and the cylinder head cover so as to seal the space between the cylinder head and the cylinder head cover.

In this kind of engine for a vehicle, in many cases, a connecting portion of an oil passage and a cam angle detecting sensor are located between the cylinder head and the cylinder head cover. In this case, portions surrounding the connecting portion of the oil passage and the cam angle detecting sensor are required to have a high rigidity so as to precisely define the positions of the connecting portion of the oil passage and the cam angle detecting sensor. To improve the rigidity, for example, a plurality of bolts are screwed to a cam cap that is fixed to the cylinder head from the cylinder head cover so as to apply fastening force to the cylinder head cover. The bolts are inserted through a cylindrical portion that is formed in the cylinder head cover. Another seal is located between the cylinder head cover and the cam cap to ensure high sealing performance at the cylindrical portion where each bolt is inserted.

As described above, if different seals are located between the cylinder head and the cylinder head cover and between the cylinder head cover and the cam cap, the number of parts is increased and the assembling operation of the parts becomes complicated.

To cope with such problems, for example, a sub seal may be integrally formed with the main seal that is located between the cylinder head and the cylinder head cover. The sub seal is connected to the main seal with a connecting element that extends toward the inside of the main seal. That is, the sub seal is used to ensure the high sealing performance at the cylindrical portion for bolt insertion.

According to the above-described configuration, the connecting element between the main seal and the sub seal is easy to be deformed. Therefore, the connecting element is vibrated due to the vibration of the engine and deformed repeatedly. This may degrade the connecting element. Particularly, if the connecting element between the main seal and the sub seal is formed in a step, the connecting element is more likely to be deformed, and the problem is aggravated.

To prevent the vibration of the connecting element, the connecting element may be supported by a pin. Specifically, the pin is provided on the inner surface of the cylinder head cover. A hole is formed in the connecting element so as to receive the pin. The pin is fitted to the hole of the connecting element so as to suppress the deformation of the connecting element. However, in this configuration, the operation of fitting the pin to the hole is required. This increases the number of manufacturing steps. Further, the pin may be dropped off the hole due to the vibration of the engine. To prevent the dropping of the pin, a head of a mushroom shape is required to be formed at the distal end of the pin. This further makes the operation of fitting the pin to the hole more difficult. For forming the pin in the mushroom shape, the manufacturing steps of the seal material become complicated. To make the mold releasing of the pin easier, a complicated mold mechanism having a slide type is necessarily used for molding.

SUMMARY OF THE INVENTION

An objective of the present invention is to provide a seal and a sealing structure that has a simple structure and reduces the number of parts and is assembled easily.

To achieve the foregoing objective and in accordance with a non-limiting embodiment of the present application, a sealing structure in which sealing is made by a sealing member between a cylinder head and a cylinder head cover is provided. The sealing member includes a main seal, a connecting element that extends from the main seal and has a distal end, a sub seal formed on the distal end of the connecting element, rigidity improving means that is formed on the connecting element and improves the rigidity of the connecting element, and a cam cap disposed between the cylinder head and the cylinder head cover, wherein the main seal is interposed between the cylinder head and the cylinder head cover, and the sub seal is interposed between the cylinder head cover and the cam cap.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A sealing member and a sealing structure according to a first embodiment of the present invention will be explained with reference to the drawings.

Figure 1:
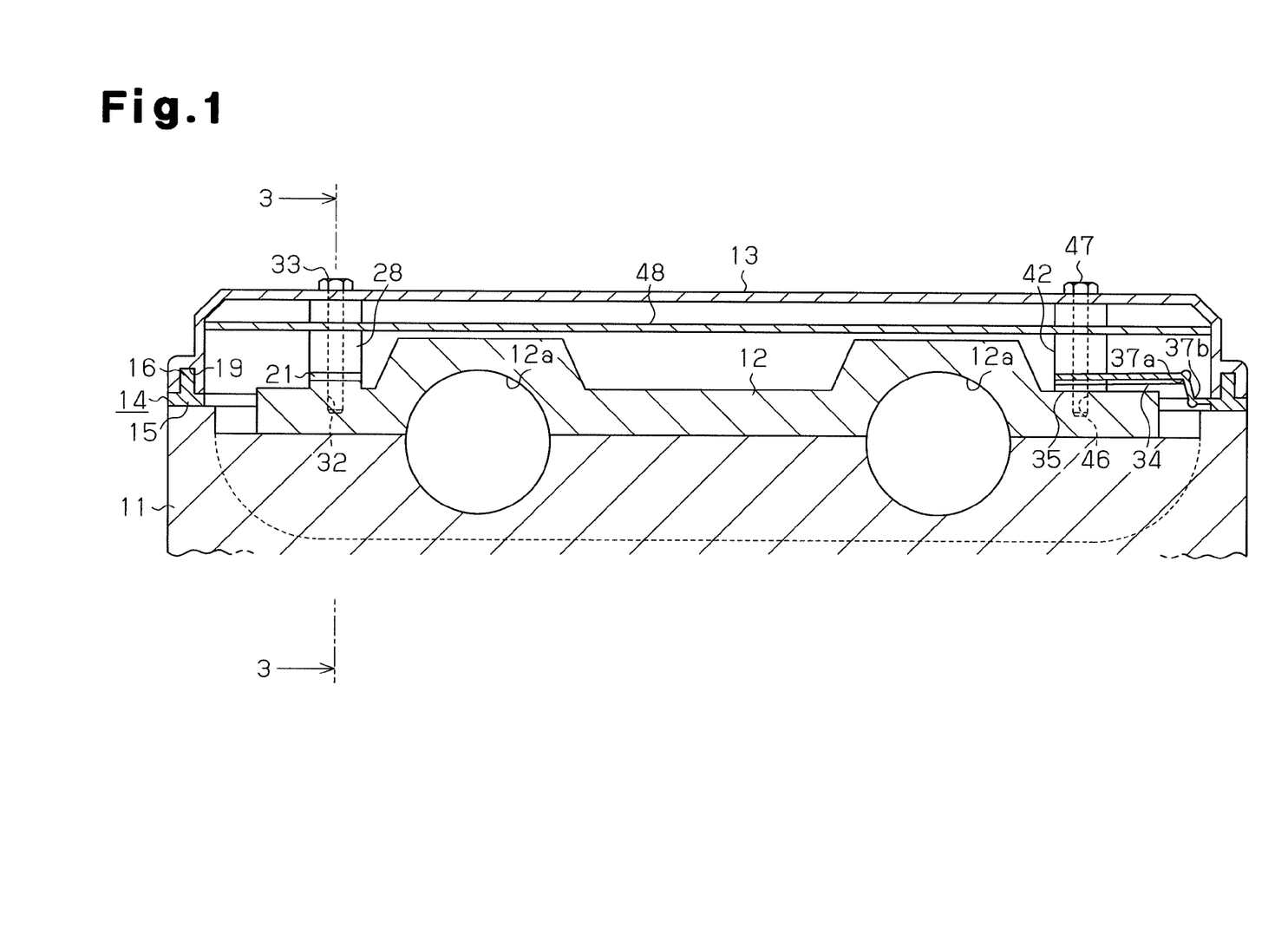
FIG. 1 is a cross-sectional view partially showing a sealing structure, in which a sealing member according to a first embodiment of the present invention is provided between the cylinder head and the cylinder head cover.

As shown in FIG. 1, a cam cap 12 is fixed to a cylinder head 11 of an engine for a vehicle by a plurality of stud bolts (not shown). A plurality of recesses 12a are formed on a lower surface of the cam cap 12. The cam cap 12 is arranged so as to cover a valve operating cam (not shown) on a camshaft (not shown) of the engine in each recess 12a.

A cylinder head cover 13 is fixed to the cylinder head 11 at its peripheral wall portions by a plurality of bolts (not shown). A sealing member 14 is provided at a connecting portion between the cylinder head 11 and the cylinder head cover 13, that is, a portion between outer peripheral portions of the cylinder head 11 and the cylinder head cover 13. The sealing member 14 is formed of a heat resisting elastic material such as acrylic rubber, fluoro-rubber, and silicone rubber. Specifically, the sealing member 14 includes a main seal 15 that is formed as a rectangular frame. The main seal 15 is provided between the cylinder head 11 and the cylinder head cover 13.

A partition plate 48 is fixed to the cylinder head cover 13 so as to divide an inner space of the cylinder head cover 13 into an upper space and a lower space. A lubricating oil passage (not shown) is formed above the partition plate 48, and a plurality of small holes (not shown) are formed in the partition plate 48. The lubricating oil supplied to the lubricating oil passage is supplied from the small holes (not shown) of the partition plate 48 to a bearing of the camshaft and the valve operating cam in a trickling manner.

Figure 2:
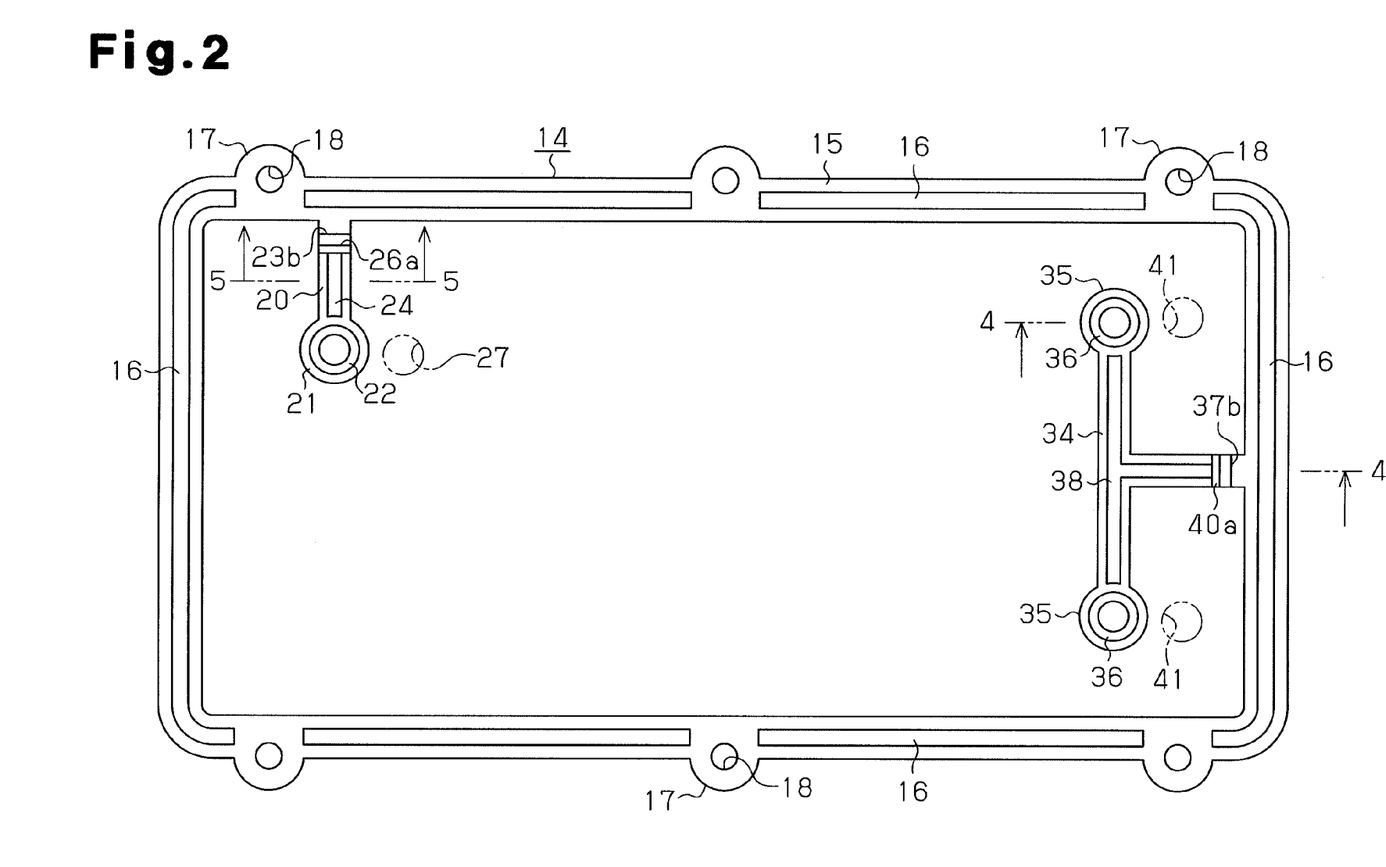
FIG. 2 is a plan view showing a sealing member of the sealing structure of FIG. 1.
Figure 6:
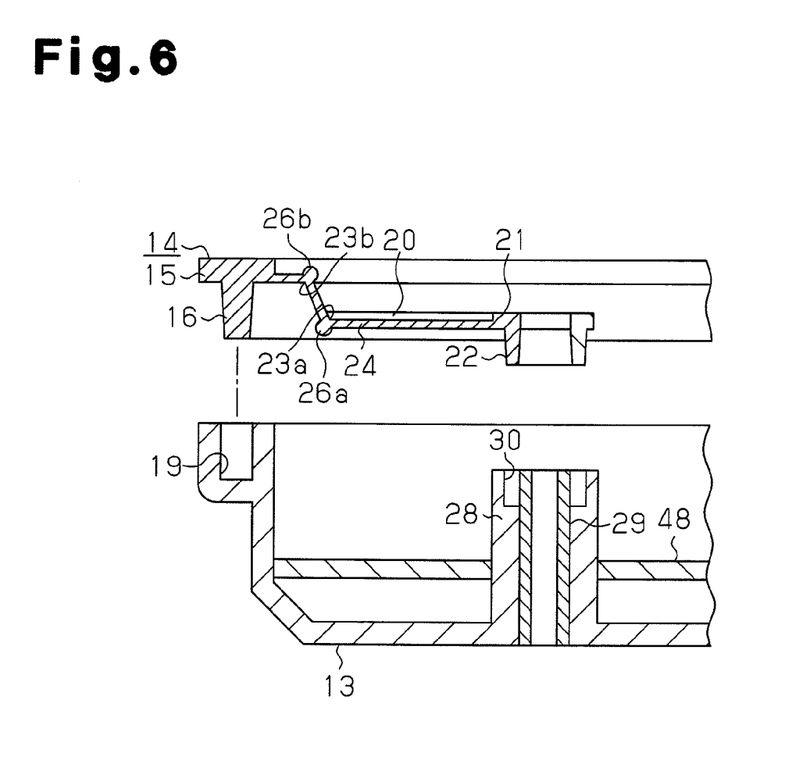
FIG. 6 is a cross-sectional view showing a method for attaching the seal to the cylinder head cover.

As shown in FIG. 2, the main seal 15 has protrusions 16 on an upper surface of the main seal 15. The protrusions 16 are integrally formed with the main seal 15. A plurality of attaching seats 17 are formed at the outer periphery of the main seal 15 so as to protrude outward. An insertion hole 18 is formed in each attaching seat 17 so as to receive the bolt. The insertion holes 18 correspond to screw holes (not shown) that are formed in the cylinder head 11 and screw insertion holes (not shown) that are formed in the cylinder head cover 13. As shown in FIG. 6, the protrusions 16 on the main seal 15 are fitted to grooves 19 that are formed on a lower surface of a peripheral wall of the cylinder head cover 13. Accordingly, the main seal 15 of the sealing member 14 is attached to the cylinder head cover 13. The cylinder head 11 and the sealing member 14 of FIG. 6 are drawn upside down with respect to FIG. 1.

The cylinder head cover 13 is positioned on the cylinder head 11 in a state where the sealing member 14 is attached to the cylinder head cover 13. The cylinder head cover 13 and the sealing member 14 are fixed to the cylinder head 11 by bolts. At this time, the bolts are screwed into the screw holes in the cylinder head 11 via the screw insertion holes of the cylinder head cover 13 and the insertion holes 18 of the main seal 15. Accordingly, the cylinder head cover 13 is assembled to the cylinder head 11, and the main seal 15 of the sealing member 14 is positioned between the cylinder head 11 and the cylinder head cover 13.

Figure 3:
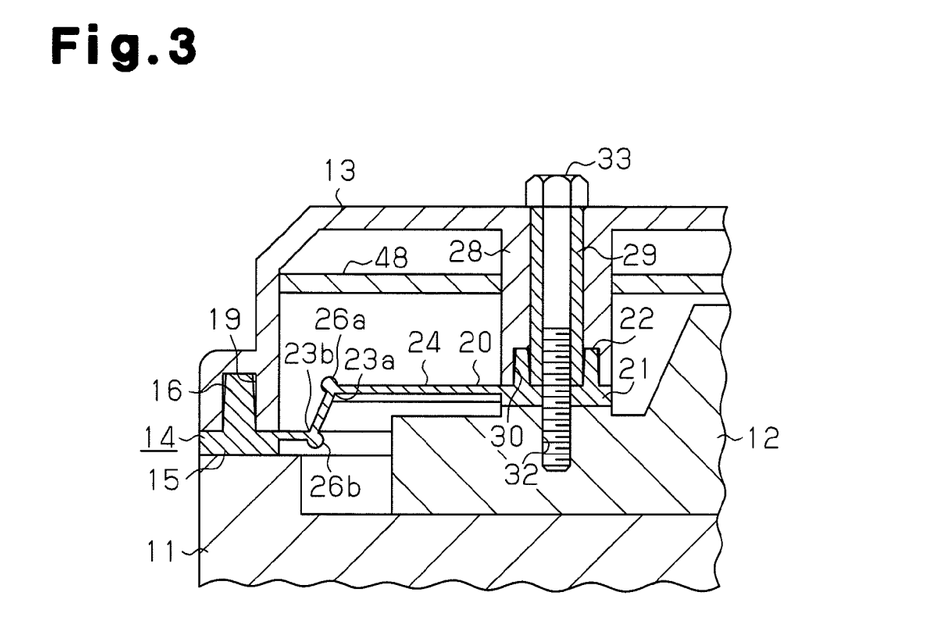
FIG. 3 is an enlarged cross-sectional view taken along a 3-3 line of FIG. 1, partially showing the sealing structure.

As shown in FIG. 2, the sealing member 14 has a first connecting element 20 and a first sub seal 21. The first connecting element 20 is formed like a belt and extends inwardly from the main seal 15. The first sub seal 21 has an annular shape and is formed at a distal end of the first connecting element 20. The first connecting element 20 and the first sub seal 21 are integrally formed with the sealing member 14. As shown in FIG. 3, a cylindrical portion 22 that protrudes upward is formed on the first sub seal 21. The first connecting element 20 has an upper bent portion 23a and a lower bent portion 23b. The bent portions 23a, 23b form a step, and the first sub seal 21 is located at a different height position with respect to the main seal 15 by the step. That is, the first sub seal 21 is at a higher position than the main seal 15.

Figure 5:
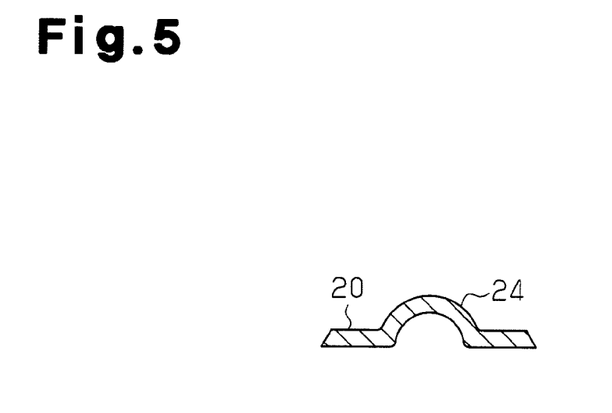
FIG. 5 is an enlarged cross-sectional view taken along a 5-5 line of FIG. 2, partially showing a seal.

As shown in FIG. 2, a rib 24, which functions as rigidity improving means, is formed on the first connecting element 20, which is located between the main seal 15 and the first sub seal 21. The rib 24 extends along a longitudinal direction of the first connecting element 20. As shown in FIG. 5, the rib 24 is formed as a hollow semicylinder. As shown in FIG. 3, an upper thick portion 26a and a lower thick portion 26b, which function as rigidity improving means, are formed at outer corners of the bent portions 23a, 23b on the first connecting element 20, respectively. The upper and lower thick portions 26a, 26b extend along the width of the first connecting element 20. The upper thick portion 26a protrudes upwardly and the lower thick portion 26b protrudes downwardly. The rib 24 and the thick portions 26a, 26b improve the rigidity of the first connecting element 20. This suppresses the first connecting element 20 from being deformed.

As shown in FIG. 2, an oil pressure feeding port 27 is formed in the partition plate 48 and the cylinder head 11 so as to be communicated with each other. As shown in FIG. 3, a boss 28 is formed in the inner surface of the cylinder head cover 13 in the vicinity of the oil pressure feeding port 27 so as to protrude downwardly. A bolt insertion cylinder 29 made of metal is fixed to the boss 28 and a circular groove 30 is formed between the lower portions of the bolt insertion cylinder 29 and the boss 28. As shown in FIG. 6, when the protrusion 16 on the main seal 15 is fitted into the groove 19 of the cylinder head cover 13, the cylindrical portion 22 on the first sub seal 21 is fitted to the groove 30 of the boss 28. Accordingly, the main seal 15 is attached to the outer periphery of the cylinder head cover 13, and the first sub seal 21 is attached to the boss 28.

In this state, as shown in FIG. 3, the bolt 33 is screwed from the cylinder head cover 13 into the screw hole 32 on the cam cap 12 via the bolt insertion cylinder 29 and the first sub seal 21. Accordingly, the adjacent portions of the oil pressure feeding ports 27 (FIG. 2) are fastened and the rigidity of the adjacent portions of the oil pressure feeding ports 27 is improved. As a result, the position of each oil pressure feeding port 27 is determined and the two oil pressure feeding ports 27 are connected to each other appropriately. Since the first sub seal 21 is located between the boss 28 of the cylinder head cover 13 and the cam cap 12, the boss 28 of the cylinder head cover 13 is sealed with respect to the cam cap 12.

Figure 4:
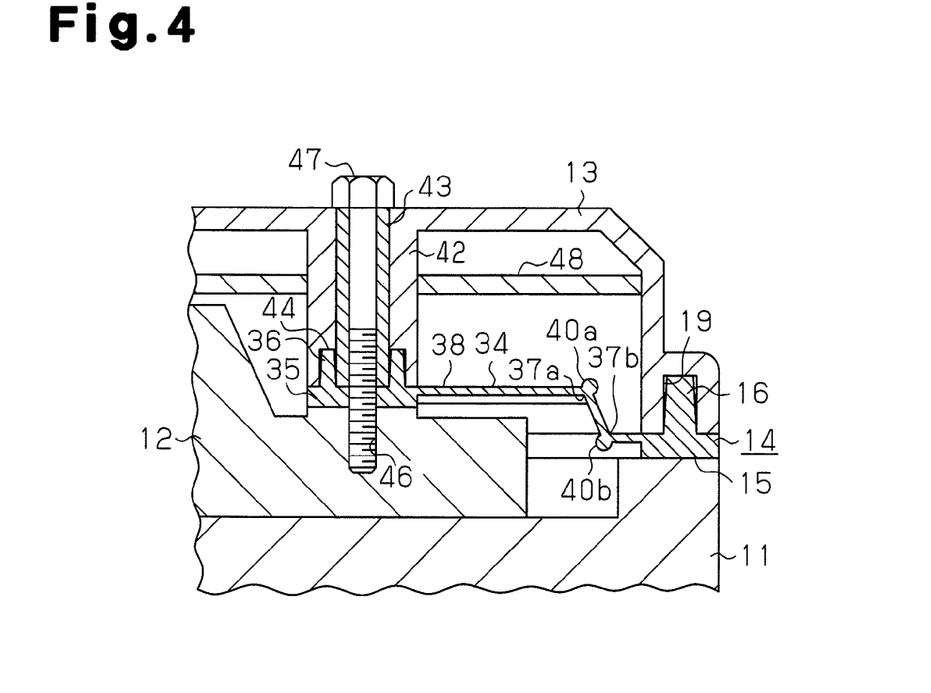
FIG. 4 is an enlarged cross-sectional view taken along a 4-4 line of FIG. 2, partially showing the sealing structure.

As shown in FIG. 2, the sealing member 14 has a T-shaped second connecting element 34 and a pair of second sub seals 35 formed at each end of the second connecting element 34. The second connecting element 34 extends inwardly from the main seal 15. Each second sub seal 35 has an annular shape. The second connecting element 34 and the second sub seal 35 are formed integrally with the sealing member 14. As shown in FIG. 4, a cylindrical portion 36 is formed on the upper surface of each second sub seal 35 so as to protrude upwardly. An upper bent portion 37a and a lower bent portion 37b are formed at distal ends of the second connecting elements 34, respectively. The bent portions 37a, 37b form a step and the second sub seal 35 is located at a different height position with respect to the main seal 15 by the step. That is, the second sub seal 35 is at a higher position than the main seal 15.

As shown in FIG. 2, the second connecting element 34 provided between the main seal 15 and the second sub seal 35 has a T-shaped rib 38 that functions as rigidity improving means like the first connecting element 20 of the first sub seal 21. The rib 38 extends from the proximal end to the distal end of the second connecting element 34. Like the rib 24 shown in FIG. 5, the rib 38 is formed as a hollow semicylinder. As shown in FIG. 4, an upper thick portion 40a and a lower thick portion 40b that function as rigidity improving means are formed at the outer corners of the bent portions 37a, 37b of the second connecting element 34. The upper and lower thick portions 40a, 40b extend along the width of the second connecting element 34. The upper thick portion 40a protrudes upwardly and the lower thick portion 40b protrudes downwardly. The rib 38 and the thick portions 40a, 40b improve the rigidity of the second connecting element 34, and this prevents the second connecting element 34 from being deformed.

As shown in FIG. 2, a pair of sensor attaching holes 41 are formed in the cylinder head cover 13. As shown in FIG. 4, in the vicinity of each sensor attaching hole 41, a pair of bosses 42 are formed in the inner surface of the cylinder head cover 13 so as to protrude downwardly. A bolt insertion cylinder 43 made of metal is fixed to each boss 42 and a circular groove 44 is formed between the lower end portions of the bolt insertion cylinder 43 and the boss 42.

When the protrusion 16 on the main seal 15 is fitted to the groove 19 of the cylinder head cover 13, the cylindrical portion 36 on each second sub seal 35 is fitted to the groove 44 of the boss 42. Accordingly, the main seal 15 is attached to the outer periphery of the cylinder head cover 13, and each second sub seal 35 is attached to the corresponding boss 42.

In this state, as shown in FIG. 4, the bolt 47 is screwed into the screw hole 46 on the cam cap 12 from the cylinder head cover 13 via each bolt insertion cylinder 43 and the corresponding second sub seal 35. This applies fastening force to the adjacent portions of each sensor attaching hole 41 (FIG. 2) and improves the rigidity of the adjacent portions of each sensor attaching hole 41. Therefore, the position of the sensor attaching hole 41 is determined, and a cam angle detecting sensor (not shown) is precisely positioned and attached to the sensor attaching hole 41. In this state, since the second sub seal 35 is positioned between the cylinder head cover 13 and the cam cap 12, the boss 42 of the cylinder head cover 13 is sealed with respect to the cam cap 12.

Next, a method for assembling the above-structured sealing structure will be explained.

Before the cylinder head cover 13 is assembled to the cylinder head 11, the sealing member 14 is attached to the lower end of the cylinder head cover 13. Specifically, as shown in FIG. 6, the protrusion 16 on the main seal 15 of the sealing member 14 is fitted to the groove 19 of the cylinder head cover 13 such that the main seal 15 is attached to the outer periphery of the cylinder head cover 13.

At this time, the first sub seal 21 and the second sub seal 35, which are positioned at the inside of the main seal 15, are positioned so as to correspond to the lower ends of the bosses 28, 42 on the cylinder head cover 13, respectively. In this state, when the cylindrical portions 22, 36 on the sub seals 21, 35 are fitted to the grooves 30, 44 at the lower end of the corresponding bosses 28, 42, respectively, the main seal 15 is attached to the lower end of the cylinder head cover 13, and each of the sub seals 21, 35 is attached to the lower end of the corresponding one of the bosses 28, 42.

In this case, since the ribs 24, 38 and the thick portions 26a, 26b, 40a, 40b are respectively formed on the first connecting element 20 and the second connecting element 34, which are positioned between the main seal 15 and each of the sub seals 21, 35, the rigidity of the first and second connecting elements 20, 34 is improved. This prevents vibration of the sub seals 21, 35 due to the deformation of the first and second connecting elements 20, 34.

Thereafter, the cylinder head cover 13 is fixed to the cylinder head 11 by the bolts. At this time, the bolt is screwed into the screw hole (not shown) on the cylinder head from the screw insertion hole of the cylinder head cover 13 via each insertion hole 18 of the main seal 15 of the sealing member 14. Accordingly, the cylinder head cover 13 is assembled to the cylinder head 11, and the main seal 15 of the sealing member 14 is positioned between the cylinder head 11 and the cylinder head cover 13.

As shown in FIGS. 3 and 4, the bolts 33, 47 are screwed from the cylinder head cover 13 into the screw holes 32, 46 in the cam cap 12 via the bolt insertion cylinders 29, 43 and the sub seals 21, 35. This improves the rigidity of the adjacent portions of the oil pressure feeding port 27 and the sensor attaching holes 41, and the positions of the oil pressure feeding port 27 and the sensor attaching holes 41 are determined. The first sub seal 21 and the second sub seal 35 are positioned between the bosses 28, 42 of the cylinder head cover 13 and the cam cap 12, respectively.

As explained above, according to the sealing structure of the first embodiment, the following advantages are obtained.

In the sealing member 14, the main seal 15 and the sub seals 21, 35 are integrally formed with each other through the first and second connecting elements 20, 34. Therefore, separate seals are not necessary to be prepared. This simplifies the structure of the sealing structure and reduces the number of parts.

Since the rigidity of the first and second connecting elements 20, 34 between the main seal 15 and the sub seals 21, 35 is improved, the vibration of the first and second connecting elements 20, 34 is suppressed, and deterioration of the first and second connecting elements 20, 34 is reduced.

A sealing structure according to a second embodiment of the present invention will be explained with focusing on the differences from the first embodiment.

Figure 7:
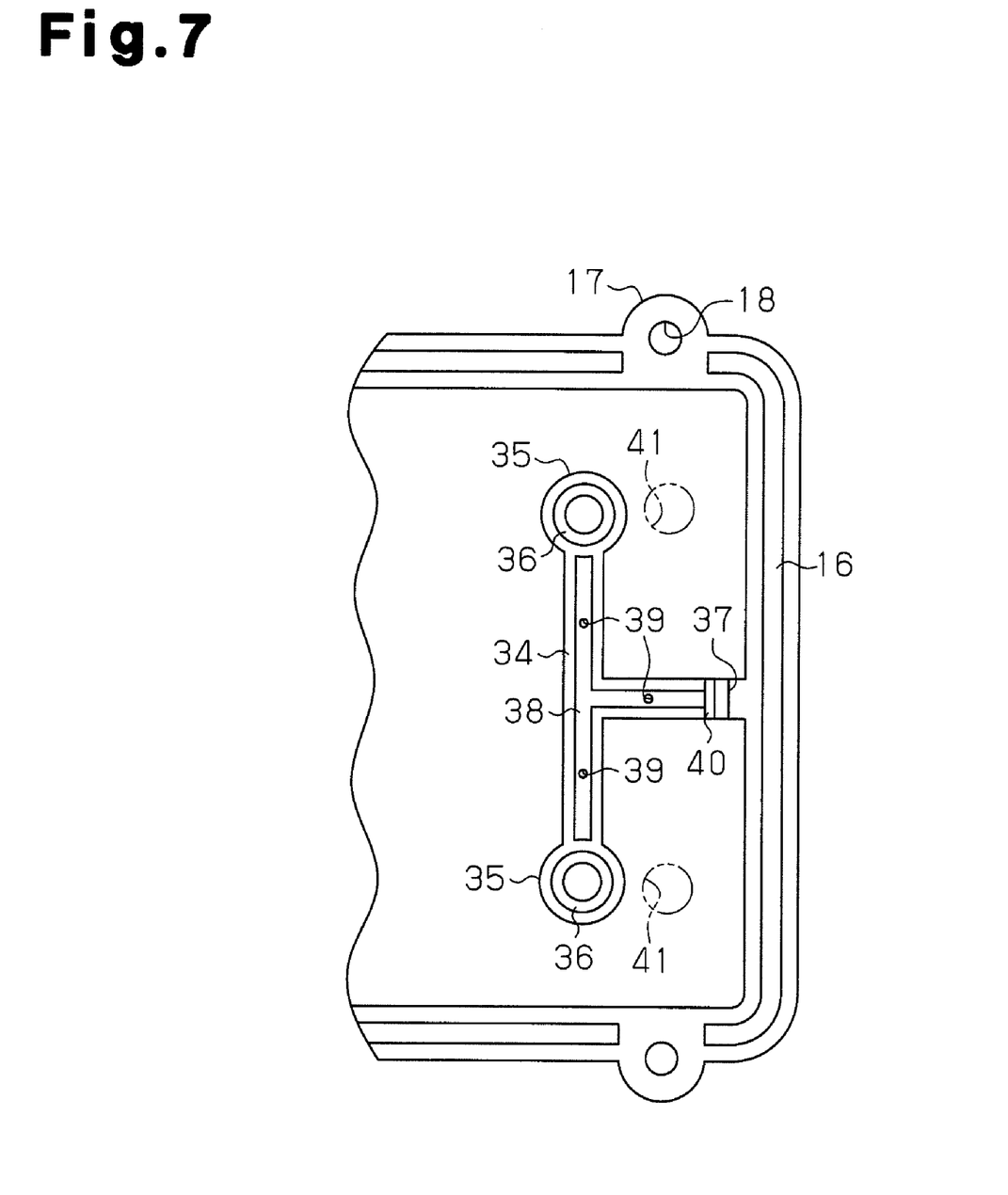
FIG. 7 is a plan view showing a sealing member of a sealing structure according to a second embodiment of the present invention.
Figure 8:
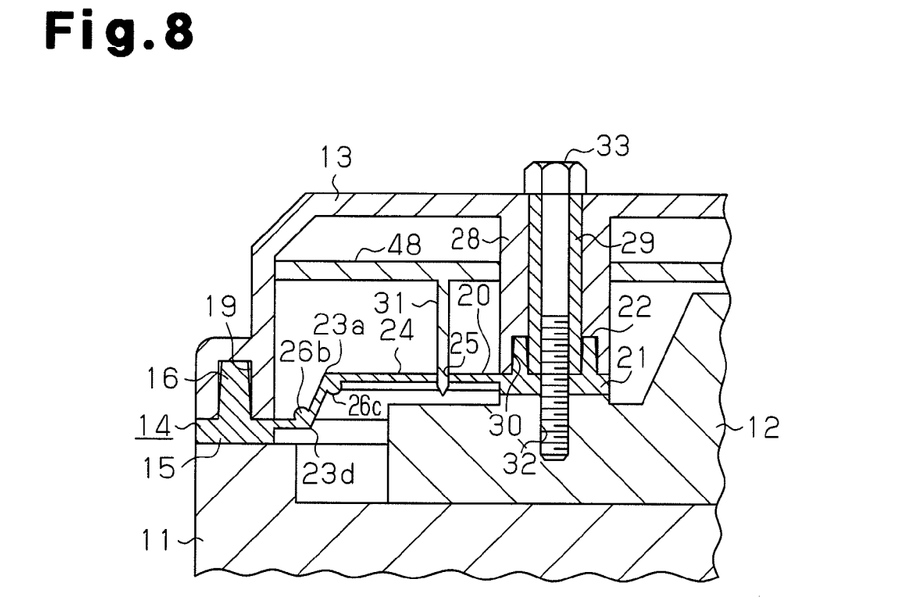
FIG. 8 is an enlarged cross-sectional view partially showing a portion corresponding to FIG. 3 in the sealing structure according to the second embodiment.
Figure 9:
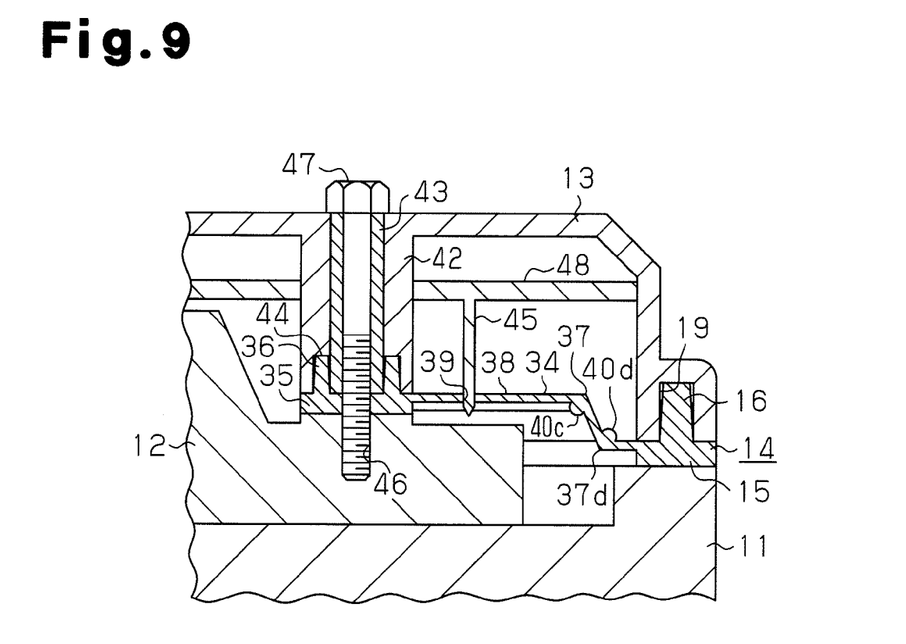
FIG. 9 is an enlarged cross-sectional view partially showing a portion corresponding to FIG. 4 in the sealing structure according to the second embodiment.

As shown in FIGS. 7 to 9, in the sealing structure according to the second embodiment, positioning pins 31, 45 are formed next to the bosses 28, 42 on the lower surface of the partition plate 48 so as to protrude downwardly. Positioning holes 25, 39 are formed at the middle portions in the longitudinal direction of the first and second connecting elements 20, 34. The positioning pins 31, 45 are inserted to the positioning holes 25, 39, respectively. The positioning pins 31, 45 do not need to be formed on the lower surface of the partition plate 48, but may be formed on the lower surface of the cylinder head cover 13. In this case, a through holes are formed in the partition plate 48 and the positioning pins 31, 45 pass through the through holes and extend to the first connecting element 20 and the second connecting element 34.

The second embodiment differs from the first embodiment in that the upper and lower thick portions 26c, 26d, 40c, 40d are formed at the inner corners of the upper and lower bent portions 23a, 23b, 37a, 37b. The upper thick portions 26c, 40c protrude downwardly and the lower thick portions 26d, 40d protrude upwardly.

According to the second embodiment, in the attached state of the sub seals 21, 35, the positioning pins 31, 45 are inserted to the positioning holes 25, 39 on the first connecting element 20 and the second connecting element 34, respectively. Accordingly, the first and second connecting elements 20, 34 are positioned and maintained in predetermined positions.

According to the sealing structure of the second embodiment, the following advantages are obtained.

Since the first and second connecting elements 20, 34 are maintained in predetermined positions by the positioning pins 31, 45, vibration of the first and second connecting elements 20, 34 is reliably prevented.

Since the first and second connecting elements 20, 34 have greater rigidity due to the ribs 24, 38 and the thick portions 26a, 26b, 40a, 40b, the positioning pins 31, 45 have efficient function with a simple shape. That is, the positioning pins do not need to be formed in a mushroom shape having a wide distal end, and a complicated molding structure is not necessary.

Since the upper and lower thick portions 26c, 26d, 40c, 40d are formed at the inner corners of the upper and lower bent portions 23a, 23b, 37a, 37b, respectively, the thick portions 26c, 26d, 40c, 40d are prevented from protruding from the upper surface and the lower surface of the first and second connecting elements 20, 34, respectively. Therefore, a total height of each of the first and second connecting elements 20, 34 is reduced.

The first and second embodiments may be modified as follows.

Only the ribs 24, 38 may be provided as rigidity improving means for the first and second connecting elements 20, 34. Alternatively, only the thick portions 26a, 26b, 26c, 26d, 40a, 40b, 40c, 40d may be provided as rigidity improving means for the first and second connecting elements 20, 34.

Reinforcing material such as grass fiber may be embedded in the connecting elements 20, 34 as rigidity improving means for the first and second connecting elements 20, 34.

The present invention is not limited to sealing members between the cylinder head 11 and the cylinder head cover 13 in an engine for a vehicle, but may be embodied as sealing members between other parts. For example, the present invention may be embodied as a sealing member provided between a cylinder block and an oil pan.

Therefore, the present examples and embodiments are to be considered as illustrative and not restrictive and the invention is not to be limited to the details given herein, but may be modified within the scope and equivalence of the appended claims.

What is claimed is:

1. A sealing structure in which sealing is made by a sealing member between a cylinder head and a cylinder head cover, the sealing member comprising:
    a main seal;
    a connecting element that extends from the main seal and has a distal end;
    a sub seal formed on the distal end of the connecting element;
    rigidity improving means that is formed on the connecting element and improves the rigidity of the connecting element; and
    a cam cap disposed between the cylinder head and the cylinder head cover;
    wherein the main seal is interposed between the cylinder head and the cylinder head cover, and the sub seal is interposed between the cylinder head cover and the cam cap.

2. The sealing structure according to claim 1, further comprising:
    a partition plate that horizontally divides a space between the cylinder head and the cylinder head cover; and
    a pin that extends from at least one of the cylinder head cover and the partition plate toward the connecting element;
    wherein the connecting element has a hole formed therethrough, the hole determining the position of the pin.

3. The sealing structure according to claim 1, wherein the connecting element includes a bent portion, and the bent portion has a shape such that the sub seal is located at a different height position with respect to the main seal.

4. The sealing structure according to claim 3, wherein the connecting element includes a step formed by the bent portion, and the sub seal is located at a position higher than the main seal by the step.

5. The sealing structure according to claim 3, wherein the rigidity improving means includes a thick portion formed on the bent portion of the connecting element.

6. The sealing structure according to claim 3, wherein the rigidity improving means includes an upper thick portion and a lower thick portion that are formed on the bent portion of the connecting element and extend along the bent portion of the connecting element.

7. The sealing structure according to claim 1, wherein the rigidity improving means includes a rib extending in a longitudinal direction of the connecting element.

8. The sealing structure according to claim 7, wherein the rib is shaped as a hollow semicylinder.

9. The sealing structure according to claim 1, wherein the connecting element is T-shaped, and the rigidity improving means includes a rib extending along the shape of the connecting element to form a T shape.

10. The sealing structure according to claim 9, wherein the rib is a hollow semicylinder.

11. The sealing structure according to claim 6, wherein the upper thick portion protrudes upwardly and the lower thick portion protrudes downwardly.

12. The sealing structure according to claim 6, wherein the upper thick portion protrudes downwardly and the lower thick portion protrudes upwardly.

13. The sealing structure according to claim 1, wherein the connecting element has a positioning hole formed therethrough.

14. The sealing structure according to claim 1, wherein the main seal is formed as a rectangular frame, and the sub seal is annular.

* * * * *